United States Patent
Hicks et al.

(10) Patent No.: US 9,468,787 B2
(45) Date of Patent: Oct. 18, 2016

(54) PROCESS AND APPARATUS FOR TREATMENT OF INCINERATOR BOTTOM ASH AND FLY ASH

(71) Applicant: Alter NRG Corp., Calgary (CA)

(72) Inventors: Kent O. Hicks, Calgary (CA); Surendra Chavda, Calgary (CA); James Santoianni, Greensburg, PA (US); Aleksandr Gorodetsky, Calgary (CA)

(73) Assignee: Alter NRG Corp., Calgary, Alberta (CA)

( * ) Notice: Subject to any disclaimer, the term of this patent is extended or adjusted under 35 U.S.C. 154(b) by 0 days.

(21) Appl. No.: 14/585,277

(22) Filed: Dec. 30, 2014

(65) Prior Publication Data

US 2015/0112114 A1  Apr. 23, 2015

Related U.S. Application Data

(62) Division of application No. 13/445,255, filed on Apr. 12, 2012, now Pat. No. 9,314,655.

(60) Provisional application No. 61/517,064, filed on Apr. 13, 2011.

(51) Int. Cl.
*A62D 3/40* (2007.01)
*B09B 3/00* (2006.01)
*C03B 5/00* (2006.01)
(Continued)

(52) U.S. Cl.
CPC . *A62D 3/40* (2013.01); *B09B 3/00* (2013.01); *B09B 3/005* (2013.01); *B09B 3/0083* (2013.01); *C03B 5/00* (2013.01); *F23G 5/0276* (2013.01);
(Continued)

(58) Field of Classification Search
CPC ..................................................... A62D 3/40
See application file for complete search history.

(56) References Cited

U.S. PATENT DOCUMENTS

| 4,542,704 A | 9/1985 | Brown et al. |
| 4,761,793 A | 8/1988 | Digne et al. |

(Continued)

FOREIGN PATENT DOCUMENTS

| DE | 4021362 A1 | 1/1992 |
| DE | 19509626 A1 | 9/1996 |

(Continued)

OTHER PUBLICATIONS

Krystyna Cedzynska et al., Plasma Vitrification of Waste Incinerator Ashes, International Ash Utilization Symposium, 1999, Paper #111, Lodz, Poland.

(Continued)

*Primary Examiner* — John Kreck
(74) *Attorney, Agent, or Firm* — Robert P. Lenart, Esq.; Pietragallo Gordon Alfano Bosick & Raspanti, LLP

(57) ABSTRACT

A method for treatment of ash from incineration plants includes: collecting ash from an incinerator; feeding the collected ash to a vitrification reactor; vitrifying the ash in the vitrification reactor, to form a slag of molten material; allowing the slag to flow from the vitrification reactor and solidify outside the vitrification reactor; gasifying volatile components in the ash and the additional feed material; and routing flue gas generated in the vitrification reactor to a heat exchanger, wherein the heat exchanger is connected to a heat recovery steam generator that receives exhaust from the incinerator.

16 Claims, 4 Drawing Sheets

(51) Int. Cl.
 *F23J 1/00* (2006.01)
 *F23G 5/027* (2006.01)
 *A62D 101/08* (2007.01)

(52) U.S. Cl.
 CPC .............. *F23J 1/00* (2013.01); *A62D 2101/08* (2013.01); *Y02W 30/20* (2015.05)

(56) References Cited

U.S. PATENT DOCUMENTS

| | | | |
|---|---|---|---|
| 4,831,943 | A | 5/1989 | Aune |
| 4,977,837 | A | 12/1990 | Roos et al. |
| 5,022,330 | A | 6/1991 | Burgher et al. |
| 5,134,944 | A | 8/1992 | Keller et al. |
| 5,259,863 | A | 11/1993 | Schneider et al. |
| 5,493,578 | A | 2/1996 | Fukusaki et al. |
| 5,584,255 | A * | 12/1996 | Bishop .................... C03B 5/005 110/235 |
| 5,958,264 | A * | 9/1999 | Tsantrizos ............... C03B 5/005 110/250 |
| 6,155,965 | A | 12/2000 | Santen et al. |
| 6,333,015 | B1 | 12/2001 | Lewis |
| 7,302,897 | B2 | 12/2007 | Pallett et al. |
| 7,632,394 | B2 | 12/2009 | Dighe et al. |
| 7,758,835 | B2 | 7/2010 | Luomaharju et al. |
| 8,690,975 | B2 * | 4/2014 | Tsangaris .................. C01B 3/22 48/61 |
| 2007/0272131 | A1 | 11/2007 | Carabin et al. |
| 2009/0307974 | A1 | 12/2009 | Dighe et al. |
| 2010/0199557 | A1 | 8/2010 | Dighe et al. |
| 2012/0061618 | A1 | 3/2012 | Santoianni et al. |

FOREIGN PATENT DOCUMENTS

| | | |
|---|---|---|
| EP | 563777 A2 | 3/1993 |
| RU | 2208202 C2 | 7/2003 |
| WO | 9003856 | 4/1990 |
| WO | WO2008104058 A1 * | 9/2008 |

OTHER PUBLICATIONS

Shin-Ichi Sakai et al., Municipal Solid Waste Incinerator Residue Recycling by Thermal Processes, Waste Management, 2000, pp. 249-258, vol. 20.

Young Jun Park et al., Vitrification of Fly Ash From Municipal Solid Waste Incinerator, Journal of Hazardous Materials, 2002, pp. 83-93, vol. B91.

T.W. Cheng et al., Treatment and Recycling of Incinerated Ash Using Thermal Plasma Technology, Waste Management, 2002, pp. 485-490, vol. 22.

E. Gomez et al., Thermal Plasma Technology for the Treatment of Wastes: A Critical Review, Journal of Hazardous Materials, 2009, pp. 614-626, vol. 161.

* cited by examiner

PROCESS AND APPARATUS FOR TREATMENT OF INCINERATOR BOTTOM ASH AND FLY ASH

CROSS-REFERENCE TO RELATED APPLICATION

This application is a divisional of U.S. application Ser. No. 13/445,255, filed Apr. 12, 2012, entitled "Process and Apparatus for Treatment of Incinerator Bottom Ash and Fly Ash", which claims the benefit of U.S. Provisional Patent Application Ser. No. 61/517,064, filed Apr. 13, 2011 and titled "Process and Apparatus for Treatment of Incinerator Bottom Ash and Fly Ash", both of which are incorporated herein by reference.

FIELD OF THE INVENTION

The invention relates to methods and apparatus for treating ash products of incineration for safe, economical disposal.

BACKGROUND

Typical fossil fuel power plants, and other incineration apparatus, such as waste incinerators, produce large amounts of bottom ash, left as residue in a combustor from the fuel combustion, and fly ash, exiting with gaseous combustion products in (flue gas) stack emissions. The ash products may contain substantial amounts of toxic matter, such as elemental metals, metal oxides, sulfur, and chlorine, considered hazardous to the environment. The ash composition often results in restrictions on the disposal of the ash and may require substantial expense in collecting and hauling the ash to a hazardous waste site which may be inconveniently located and have considerable deposit fees, and such a site itself remains an environmental hazard, Suggestions have been made for processing ash by various treatments to a form intended to result in a reduced hazard with less expense of disposition. These have not been adopted to a large extent and there remains a need and desire for more effective and efficient treatment.

SUMMARY

In a first aspect, a method for treatment of ash from incineration plants includes: collecting ash from an incinerator, feeding the collected ash to a vitrification reactor, vitrifying the ash in the vitrification reactor, to form a slag of molten material, allowing the slag to flow from the vitrification reactor and solidify outside the vitrification reactor, gasifying volatile components in the ash and the additional feed material, and routing flue gas generated in the vitrification reactor to a heat exchanger, wherein the heat exchanger is connected to a heat recovery steam generator that receives exhaust from the incinerator.

In another aspect, an apparatus includes an incinerator, a vitrification reactor, a first feed passage for transporting bottom ash from a bottom of the incinerator to the gasification/vitrification reactor, an incinerator exhaust gas fly ash recovery system including a heat recovery steam generator, a second feed passage for transporting fly ash collected by the recovery system to the vitrification reactor, and a vitrification reactor exhaust gas fly ash recovery system including a heat exchanger connected to the heat recovery steam generator.

DETAILED DESCRIPTION

Figure 1:
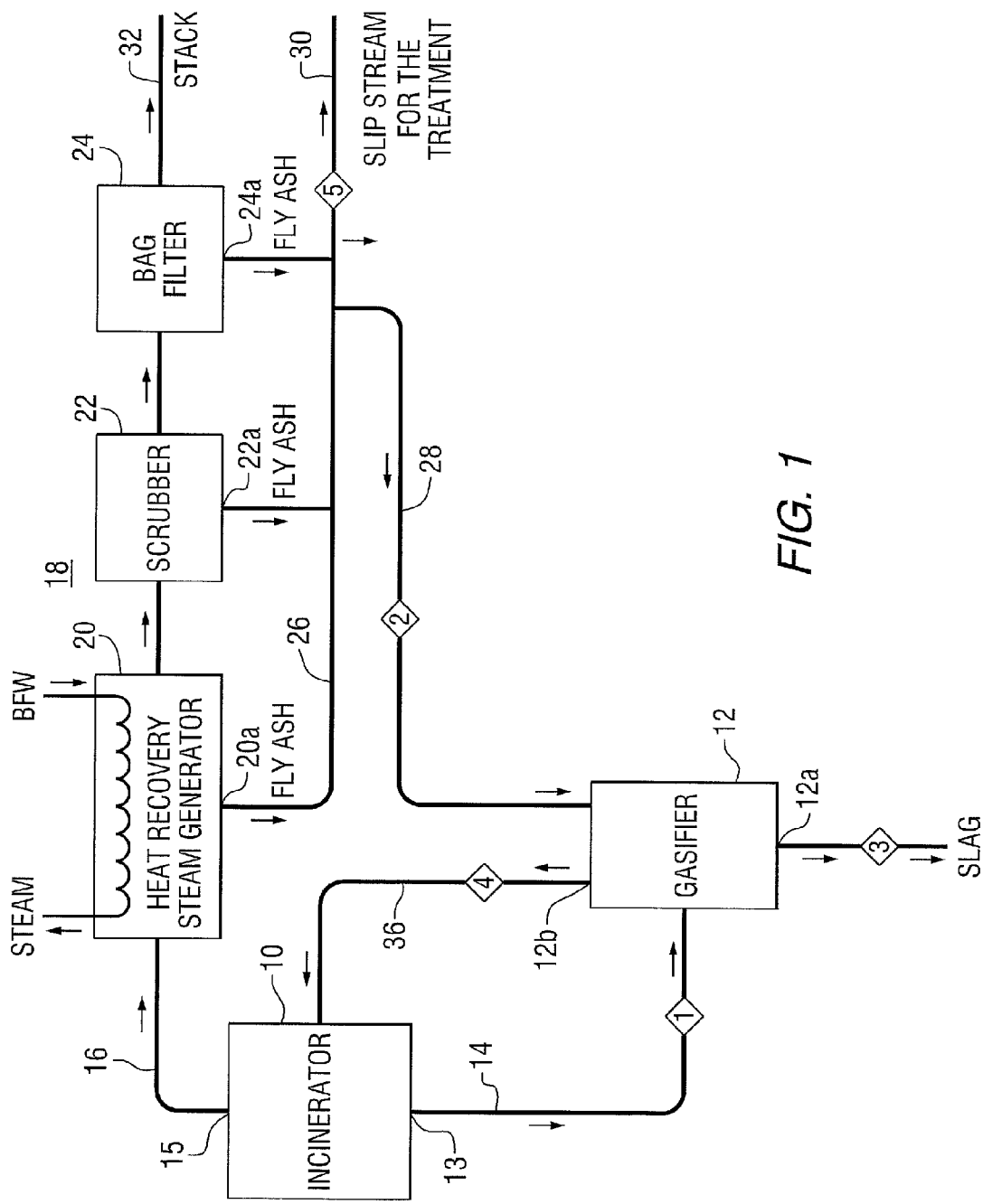
FIG. 1 is a block diagram of an example ash treatment system.

An apparatus and process is described in which either, or both, bottom ash and fly ash can be treated for disposition. In various embodiments, the process can include some or all of the steps of, for example, collecting fly ash from incinerator exhaust and bottom ash from an incinerator, feeding the collected fly ash and bottom ash to a gasification/vitrification reactor (GVR), optionally supplying an additional feed material other than the ash to the GVR, which feed material may be any material suitable for gasification such as municipal solid waste (MSW), refuse-derived fuel (RDF), biomass, coal, hazardous waste, medical waste, liquid waste streams of coal or other carbonaceous products, or a combination of any such materials, vitrifying the ash, and any other inert constituents in the feed material, in the GVR, to form a slag of molten material that includes a substantial amount (e.g., up to about 90% or more) of the hazardous material from the feed material, allowing the slag to flow from the GVR and solidify outside the GVR ready for safe disposition without environmental concerns, gasifying volatile components in the fly ash, bottom ash, and additional feed material, and routing any syngas generated in the GVR back to the incinerator where it can be combusted in order to augment the thermal environment of the incinerator.

Apparatus for performing the process may take a variety of forms among which are, as parts of an overall system in combination, an incinerator, a gasification/vitrification reactor (GVR), for example, a plasma gasification/vitrification reactor (PGVR), a first feed conduit for transporting bottom ash from the bottom of the incinerator to the GVR, an incinerator exhaust gas fly ash recovery system that may include one or more of a heat recovery steam generator (or boiler or heat exchanger), a scrubber, and a bag filter between the incinerator and an emission stack, and a second feed conduit for transporting fly ash collected by the recovery system to the GVR. The GVR can include a slag tap hole and an external slag receptacle can be provided for solidification of the slag.

Numerous variations in the process or apparatus can be included. For example, the bottom ash and the fly ash may be fed together, or separately, to the GVR and the ash may be fed with other feed material, or not. If a plasma gasification/vitrification reactor (PGVR) is used, the ash, and other material if used, may be fed through a charge door (or feed chute) above a carbonaceous bed of the PGVR or through a tuyere into the carbonaceous bed, either with or separate from a plasma torch plume. One apparatus that includes the injection of particulate material with a plasma torch plume is shown in U.S. Pat. No. 4,761,793, by Dighe, for a "Plasma Fired Feed Nozzle", which is hereby incorporated by reference.

Embodiments include those in which gaseous products of the gasifier are supplied as a syngas to the incinerator and/or are supplied to a heat exchanger which may be interconnected with a heat recovery steam generator of the incinerator exhaust gas system.

Additional optional variations in the process and apparatus are described below, all of which are examples of the suitable techniques for ash treatment.

It is believed the described subject matter offers opportunities for improved, economical results in ash treatment. Among favorable aspects attainable are not only easier disposition of metal and other toxic constituents of ash because of a change of form (or vitrification), to solids from which those constituents are not likely to leach out of, but also the destruction of toxic materials such as dioxin and furan.

Referring to FIG. 1, a system is shown that includes an incinerator 10 and a gasification/vitrification reactor (GVR) 12. The incinerator 10 has a bottom ash outlet 13. A feed loop or passage in the form of a conduit 14 from the outlet 13 of incinerator 10 to the GVR 12 is provided for supplying bottom ash from the incinerator to the GVR.

The incinerator 10 includes an exhaust gas outlet 15 that is connected by a passage in the form of a conduit 16 to a fly ash recovery system 18 which, in this example, includes, in series, a heat recovery steam generator (or boiler) 20, a scrubber 22, and a bag filter 24 from each of which some fly ash is recovered from outlets 20a, 22a, and 24a respectively, of those individual components.

The steam generator 20 is shown with a supply of boiler feed water (BFW) and an outlet of steam (e.g., to be supplied to a turbine for power generation).

Fly ash, and incidental other matter, recovered from the outlets 20a, 22a, and 24a is combined together in a passage in the form of a conduit 26 that is connected to a passage in the form of a conduit 28 for supplying fly ash to the GVR 12. Some of the constituents collected from the outlets 20a, 22a, and 24a may exit the conduit 26 by a slip stream conduit 30 for further treatment and disposal outside the described system. It is usually intended to design and operate the system to maximize the amount of fly ash and related material from the conduit 26 fed to the GVR 12 via the conduit 28.

Recycling ash to the gasifier may still cause some volatile metals to go back up into the incinerator. Since not all metals can be removed in the slag, there may be a build-up of certain metals (e.g., mercury, lead, zinc and other) in the ash stream. A slip stream can be used to balance out such metals in the ash stream. The slip stream can have a much smaller mass than the original ash stream.

Some gaseous and other material from the incinerator exhaust 15 may pass through the fly ash recovery system 18 without being collected and such gaseous and other material can be exhausted as stack gas at an outlet 32. The scrubber 22 and bag filter 24, and/or possible other equipment, can provide sufficient collecting and cleaning of the emissions so the stack gas through outlet 32 is safe to discharge to the atmosphere. It is not necessary to discharge all carbon dioxide; any products of combustion can be usefully recycled back to the GVR 12 if desired.

The action of the GVR 12 results in significant destruction of toxic constituents of the fly ash streams from conduits 14 and 28, such as dioxin and furan, in addition to slag formation. Slag can be let out of the gasifier 12 through a bottom tap hole 12a when it is in a molten (or vitreous) form, and directed by a conduit 34 to a receptacle (not shown) for solidification. The solidified stag would contain major amounts of metal and other undesirable elements of the fly ash (as well as from the other feed material if used) treated in the GVR. Any slag formation process described herein may include the addition of fluxing agents to the GVR.

In addition, the example of FIG. 1 shows an upper outlet 12b of the GVR 10 for gaseous products of the GVR that can be fed through a conduit 36 as a syngas for combustion in the incinerator 10.

Tables 1 and 2 have data representative of the performance of the system shown in FIG. 1.

TABLE 1

Startup Initial Condition

| Component | 1 Bottom ash kg/day | 2 Fly ash Recirculation kg/day | 3 Slag kg/day | 4 Gasifier Carryover kg/day | 5 Fly ash slip stream kg/day |
|---|---|---|---|---|---|
| S | 132.50 | 136.20 | 94.66 | 174.04 | 0.00 |
| Cl | 152.50 | 429.00 | 20.12 | 561.38 | 0.00 |
| Si | 3725.0 | 678.00 | 4400.80 | 2.20 | 0.00 |
| Al | 1917.50 | 473.40 | 2387.55 | 3.35 | 0.00 |
| Ca | 4050.00 | 942.00 | 4598.63 | 393.37 | 0.00 |
| Fe | 857.50 | 49.80 | 904.49 | 2.81 | 0.00 |
| Na | 477.50 | 224.40 | 608.90 | 93.00 | 0.00 |
| K | 205.00 | 184.80 | 316.95 | 72.85 | 0.00 |
| Mg | 582.50 | 157.20 | 733.41 | 6.29 | 0.00 |
| P | 170.00 | 28.80 | 198.24 | 0.56 | 0.00 |
| B | 2.75 | 0.90 | 3.20 | 0.45 | 0.00 |
| Mn | 15.50 | 1.92 | 17.37 | 0.05 | 0.00 |
| Pb | 18.50 | 5.46 | 1.23 | 22.73 | 0.00 |
| Cd | 0.50 | 0.36 | 0.01 | 0.85 | 0.00 |
| As | 0.07 | 0.04 | 0.00 | 0.11 | 0.00 |
| Hg | 0.02 | 0.01 | 0.00 | 0.03 | 0.00 |
| Zn | 94.00 | 51.84 | 35.61 | 110.23 | 0.00 |
| Cu | 51.25 | 15.96 | 59.34 | 7.87 | 0.00 |
| Cr | 8.50 | 1.74 | 10.24 | 0.00 | 0.00 |
| Se | 0.01 | 0.00 | 0.01 | 0.00 | 0.00 |
| Sn | 215.00 | 13.20 | 215.99 | 12.21 | 0.00 |
| Oxygen in oxides | 12323.90 | 2604.96 | 13400.15 | 1528.72 | 0.00 |
| Total | 25000.00 | 6000.00 | 28006.91 | 2993.09 | 0.00 |
| PCCD/PCDF (dixoins) (ng/g) | 160 | 320 | 0.012 | 1 | |
| TEQ (ng/g) | 1.5 | 3.7 | 0.0005 | 0.0064 | |

TABLE 2

Startup Initial Condition

| Component | 1 Bottom ash kg/day | 2 Fly ash Re-circulation kg/day | 3 Slag kg/day | 4 Gasifier Carryover kg/day | 5 Fly ash slip stream kg/day |
|---|---|---|---|---|---|
| S | 132.50 | 233.21 | 128.84 | 236.87 | 139.86 |
| Cl | 152.50 | 908.41 | 36.71 | 1024.21 | 544.79 |
| Si | 3725.0 | 425.12 | 4148.05 | 2.08 | 254.95 |
| Al | 1917.50 | 297.87 | 2212.26 | 3.10 | 178.64 |
| Ca | 4050.00 | 829.20 | 4494.72 | 384.48 | 497.28 |
| Fe | 857.50 | 32.86 | 887.60 | 2.76 | 19.70 |
| Na | 477.50 | 196.06 | 584.32 | 89.25 | 117.58 |
| K | 205.00 | 157.92 | 295.09 | 67.83 | 94.71 |
| Mg | 582.50 | 101.90 | 678.59 | 5.82 | 61.11 |
| P | 170.00 | 18.33 | 187.81 | 0.53 | 10.99 |
| B | 2.75 | 0.84 | 3.15 | 0.44 | 0.50 |
| Mn | 15.50 | 1.23 | 16.68 | 0.05 | 0.74 |
| Pb | 18.50 | 35.34 | 2.77 | 51.07 | 21.19 |
| Cd | 0.50 | 1.40 | 0.02 | 1.88 | 0.84 |
| As | 0.07 | 0.18 | 0.00 | 0.25 | 0.11 |
| Hg | 0.02 | 0.06 | 0.00 | 0.07 | 0.03 |
| Zn | 94.00 | 145.61 | 58.51 | 181.10 | 87.33 |
| Cu | 51.25 | 14.81 | 58.33 | 7.74 | 8.88 |
| Cr | 8.50 | 1.09 | 9.59 | 0.00 | 0.65 |

TABLE 2-continued

Startup Initial Condition

| Component | 1<br>Bottom<br>ash<br>kg/day | 2<br>Fly ash<br>Re-<br>circulation<br>kg/day | 3<br>Slag<br>kg/day | 4<br>Gasifier<br>Carryover<br>kg/day | 5<br>Fly<br>ash slip<br>stream<br>kg/day |
|---|---|---|---|---|---|
| Se | 0.01 | 0.00 | 0.01 | 0.00 | 0.00 |
| Sn | 215.00 | 15.98 | 218.62 | 12.36 | 9.58 |
| Oxygen in oxides | 12323.90 | 2582.57 | 13380.05 | 1526.42 | 1548.82 |
| Total | 25000.00 | 5999.99 | 27401.70 | 3598.29 | 3598.30 |
| PCCD/PCDF (dixoins) (ng/g) | 160 | ~200 | 0.012 | 1 | ~200 |
| TEQ (ng/g) | 1.5 | ~2.3 | 0.0005 | 0.0064 | ~2.3 |

The tables show quantities of components at various locations in the system. Column numbers of the tables correspond to the single digits in FIG. 1. Column 1 refers to bottom ash from the incinerator 10 that passes through the conduit 14; column 2 refers to recirculated fly ash that passes through the conduit 28; column 3 refers to slag extracted out of the GVR through conduit 34; column 4 refers to GVR carryover (e.g., syngas) that passes through conduit 36; and column 5 refers to the slip stream from conduit 30. Table 1 shows the quantities under initial start-up conditions and Table 2 shows the quantities after the operation has reached an equilibrium condition. The quantities are listed in kilograms per day. Among the significant facts indicated by this data are that of a total ash output with metals and their oxides, plus S and Cl, of 25,000 kg/day in bottom ash and 65,000 kg/day in fly ash (i.e., a total of about 31,000 kg/day), at equilibrium the slag contains about 27,400 kg/day (or about 88%) of such materials in this example, leaving only a small amount in the slip stream to be otherwise disposed of.

Tables 1 and 2 also show that the dioxin and toxic equivalent (TEQ) content of the slip stream in column 5 is reduced from the quantities in the total ash quantities.

Some incinerators operate inefficiently, and leave a large amount of carbon in the bottom ash. By recycling the bottom ash and returning the gas produced in the gasifier over the grate of the incinerator, the incinerator temperature can be increased, thereby improving the carbon consumption within the incinerator itself.

Figure 2:
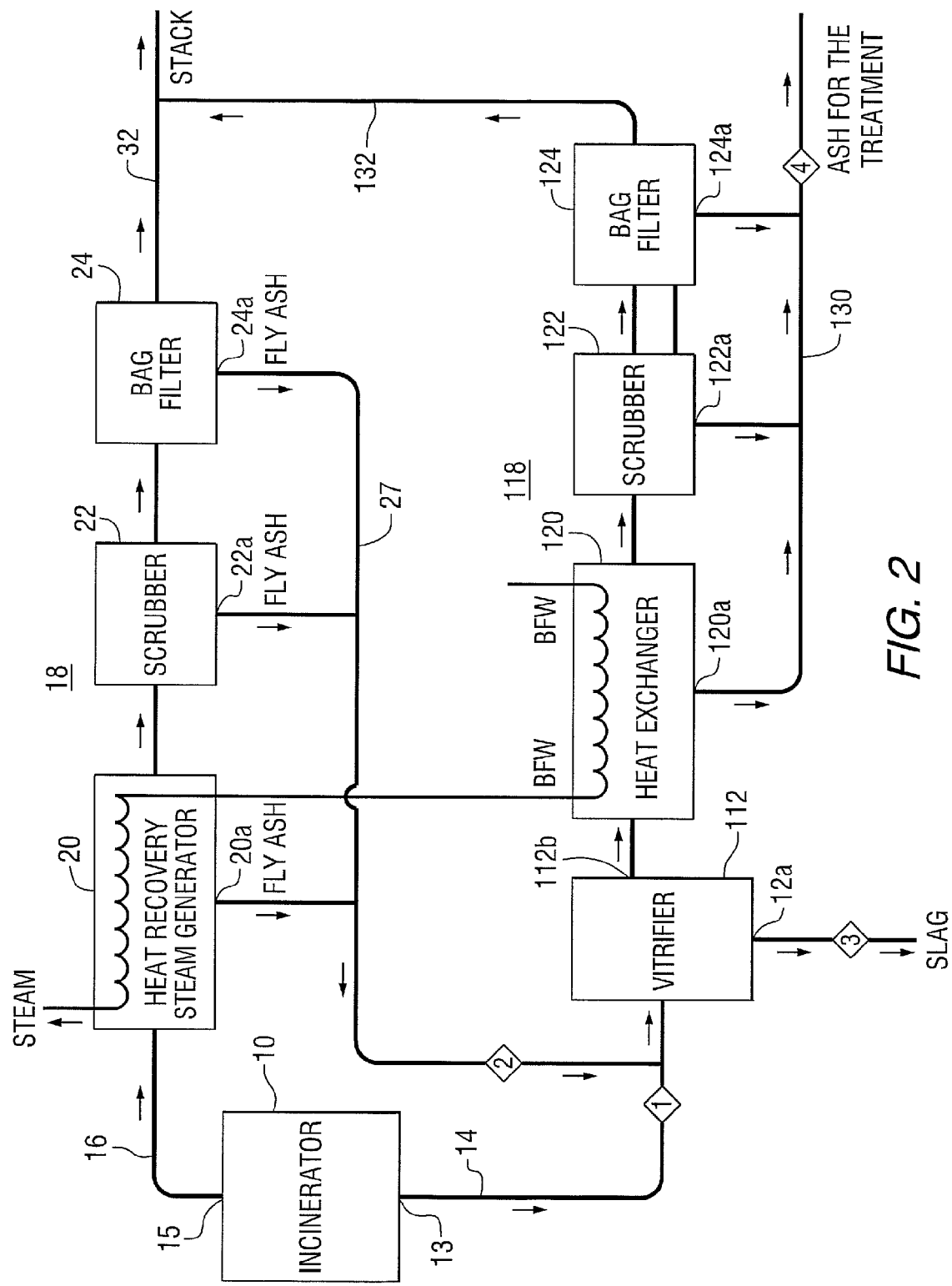
FIG. 2 is a block diagram of another example ash treatment system.

FIG. 2 illustrates another example system. Like parts of the system of FIG. 2 are assigned the same reference numbers as in FIG. 1. Among the various differences from the system of FIG. 1 are: instead of supplying a syngas from a GVR 12 back to the incinerator 10, in FIG. 2 the ash is processed in a vitrification reactor (VR) 112. The energy used to vitrify the inert constituents may come from a fuel, from a waste stream having suitable energy content, and/or through the application of a plasma such as is used in a plasma vitrification reactor. This type of reactor can be operated under oxidizing conditions such that the gaseous output is flue gas. The flue gas output from an upper exit 112b passes to another ash recovery system 118 having a heat exchanger 120, a scrubber 122, and a bag filter 124 with ash, and possible other material, collected from the respective outlets 120a, 122a, and 124a going to a conduit 130 for withdrawal from the system and further treatment elsewhere. Gaseous effluent from the system 118 passes through a conduit 132 to a stack, along with gases in conduit 32 from the system 18. The heat exchanger 120 of the recovery system 118 has an inlet for boiler feed water (BFW) that is preheated by the VR emissions and then supplied to the heat recovery steam generator 20 of the recovery system 18.

In the system of FIG. 2, the reactor is used as a vitrifier that can fully combust any material within the vessel while slagging any ash component to the extent possible. Rather than recycling hot gas back to the incinerator, heat is recovered in a heat exchanger and used to heat boiler feed water that is used by the heat recovery steam generator 20. Then the output from the vitrifier is cleaned and exhausted. The system of FIG. 2 allows for customization of the clean-up equipment for the vitrifier exhaust gas flow (e.g., smaller size) and the specific metals/contaminants for the vitrifier exhaust gas stream. Overall, this may provide a better clean-up system, possibly with a lower emissions profile. In the system of FIG. 1, all gas from the gasifier is returned to the incinerator.

The system of FIG. 2 also differs from the system of FIG. 1 in that the fly ash collected by the fly ash recovery system 18 is supplied by a conduit 27 that is coupled to conduit 14, which has bottom ash from the incinerator 10, and the fly ash and bottom ash are supplied together to the VR 112.

Table 3 shows a stream summary showing an even greater diminishment in ash requiring additional treatment (hazardous waste disposal). The metals and oxides plus S and Cl, in slag from the VR, shown in column 3, amount of about 90% of those constituents in the ash as shown in columns 1 and 2 with correspondingly less ash for other treatment as shown in column 4. Additionally, the FIG. 2 system provides significantly reduced output amounts of dioxins and TEQ requiring other treatment. Of course, systems and processes as described herein may be usefully applied even without such results.

TABLE 3

Stream Summary

| Component | 1<br>Bottom ash<br>kg/day | 2<br>Fly ash<br>kg/day | 3<br>Slag<br>kg/day | 4<br>Ash<br>For Treatment<br>kg/day |
|---|---|---|---|---|
| S | 132.50 | 136.20 | 94.65 | 174.05 |
| Cl | 152.50 | 429.00 | 20.12 | 561.38 |
| Si | 3725.0 | 678.00 | 4400.67 | 2.33 |
| Al | 1917.00 | 473.40 | 2387.63 | 3.27 |
| Ca | 4050.00 | 942.00 | 4598.45 | 393.55 |
| Fe | 857.50 | 49.80 | 904.45 | 2.85 |
| Na | 477.50 | 224.40 | 608.87 | 93.03 |
| K | 205.00 | 184.80 | 316.93 | 72.87 |
| Mg | 582.50 | 157.20 | 733.38 | 6.32 |
| P | 170.00 | 28.80 | 198.24 | 0.56 |
| B | 2.75 | 0.90 | 3.20 | 0.45 |
| Mn | 15.50 | 1.92 | 17.37 | 0.05 |
| Pb | 18.50 | 5.46 | 1.23 | 22.73 |
| Cd | 0.50 | 0.36 | 0.01 | 0.85 |
| As | 0.07 | 0.04 | 0.00 | 0.11 |
| Hg | 0.02 | 0.01 | 0.00 | 0.03 |
| Zn | 94.00 | 51.84 | 35.61 | 110.23 |
| Cu | 51.25 | 15.96 | 59.34 | 7.87 |
| Cr | 8.50 | 1.74 | 10.24 | 0.00 |
| Se | 0.01 | 0.00 | 0.01 | 0.00 |
| Sn | 215.00 | 13.20 | 222.84 | 5.36 |
| Oxygen in oxides | 12323.90 | 2604.96 | 13400.57 | 1528.30 |
| Total | 25000.00 | 6000.00 | 28013.82 | 2986.18 |
| PCCD/PCDF (dixoins) (ng/g) | 160 | 320 | 0.012 | 1 |
| TEQ (ng/g) | 1.5 | 3.7 | 0.0005 | 0.0064 |

Various features of the system of FIG. 2 may be applied individually to a system such as that of FIG. 1, as well as together in combination as shown in FIG. 2.

The scrubbers 22 and 122 of the above described systems may be arranged so their inputs, from a source (not shown) in addition to the components 20 and 120, respectively, include amounts of scrubbing agents such as lime and activated carbon.

Additional aspects of the systems that may be varied include: variations in reactor inputs of external feed materials, whether or not with the use of plasma torches; or variations in the amount of input air or oxygen to the reactor (e.g., to get more or less complete stoichiometric combustion), including: for a system such as that of FIG. 1 intended to produce a syngas for the incinerator 10, sub-stoichiometric amounts of air, oxygen, or both, that may be supplied (or allowed in) to the reactor 12, while more complete, stoichiometric, quantities can be present in the reactor of a system such as that of FIG. 2 for producing flue gas. In other embodiments, air, oxygen, or both, can be supplied to the vitrification reactor, wherein the amount of oxygen exceeds a stoichiometric amount.

In another embodiment, the system may be arranged with optionally operated conduits and valves so the same system can be operated in either a syngas mode or a flue gas mode when desired.

In addition to, or instead of, supplying syngas output from a GVR to an incinerator, as shown in FIG. 1, the syngas may have different downstream applications, e.g., for producing any one or more of heat, steam, power, and liquid fuels.

For optional operation in a flue gas mode, an additional burner may be provided in the top (e.g., the upper volume) of the reactor, for combusting syngas produced in the lower portion of the reactor, while adding air or oxygen, or both, to the syngas.

Any such production of flue gas from syngas may also be performed by sending the syngas to a combustor external to the GVR.

The ash recovery system 118 of FIG. 2 is an example of a dedicated gas cleanup system which may be used for either flue gas or syngas cleanup to remove fly ash, unreacted carbon, volatile metals, sulfur and chlorine species that may be present.

Any products of a cleanup system, such as system 118, may be introduced back into any incinerator (or GVR) in addition to, or instead of, released directly as stack gas to the atmosphere.

The system of FIG. 2 integrates the steam system from a boiler/heat exchanger on the vitrification reactor side with the steam system of the incinerator. The vitrification reactor steam system recovers some additional energy that would not otherwise be recovered. Carbon from the bottom ash and fly ash is combusted in the vitrification reactors and the energy is recovered as heat. This heat can be converted to steam and combined with the steam system of the incinerator for power production.

It will be apparent that further modifications, and combinations of modifications, of the described systems may be practiced as well. For example, in any system of either FIG. 1 or 2, and the mentioned variations, the reactor can be directly attached to the incinerator or can be free standing and connected with the incinerator by any needed conduits (which may be any form of passageways, e.g., in the form of metal ductwork or piping or masonry).

Figure 3:
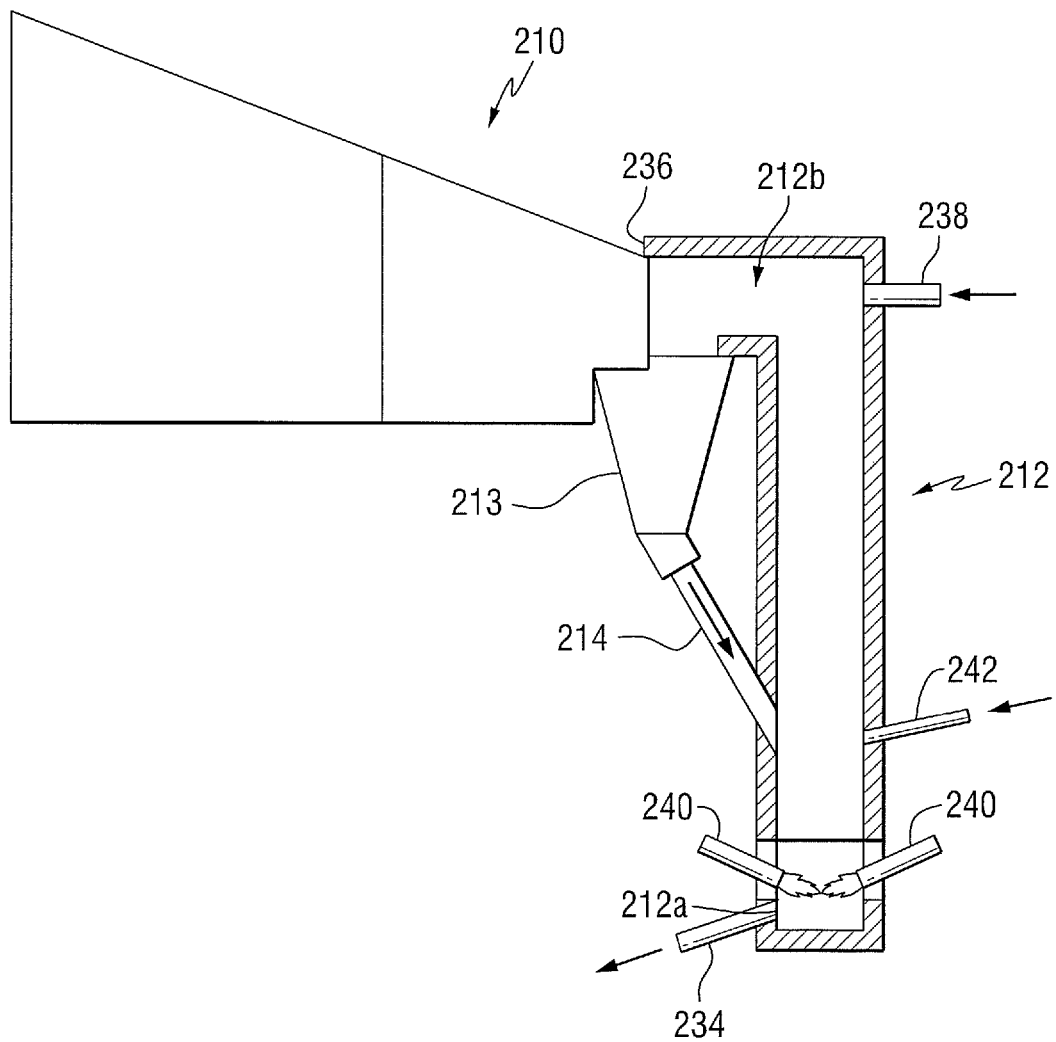
FIG. 3 is a schematic illustration of some parts of an example ash treatment system.

FIG. 3 shows a generalized schematic of an example system in which an incinerator 210 is combined, or integrated, with a reactor 212 that is close by, with a feed chute 213 for bottom ash from the incinerator having a feed leg 214 directly coupled to the reactor. In one embodiment, the illustrated ash feed chute apparatus 213 can include an internal diverter spool piece (not shown) for optional use, such as to divert ash from the reactor 212 when the reactor is shut down. FIG. 3 additionally shows a syngas exit 212b from the reactor 212 that has a direct connection with structure of the incinerator 210 at an interface 236.

Figure 4:
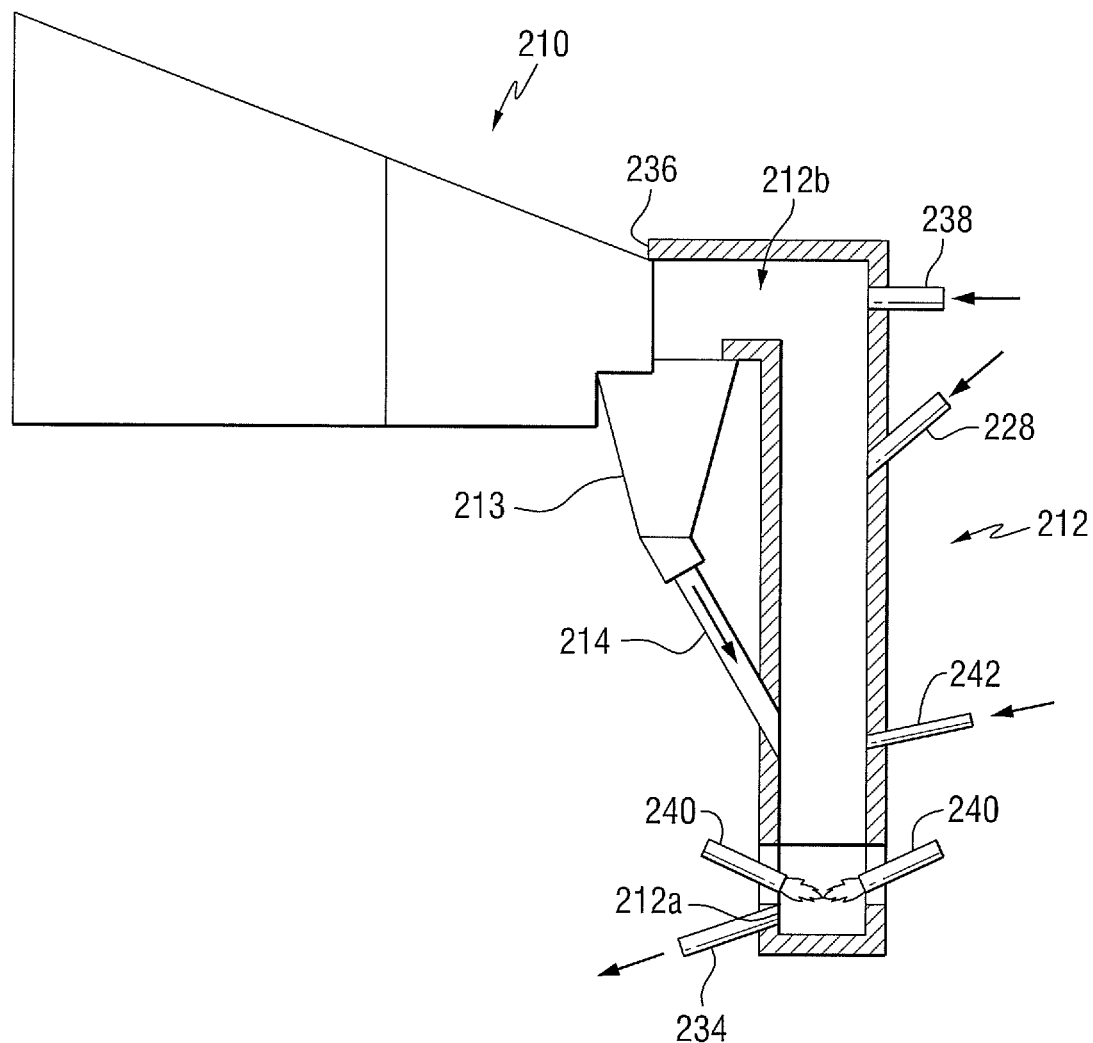
FIG. 4 is a schematic illustration of some parts of another example ash treatment system.

The apparatus shown in FIG. 3 can be used for treatment in the reactor 212 of bottom ash from the incinerator 210 (normally of a much larger quantity than the fly ash likely to be produced by the incinerator). The apparatus of FIG. 3 could be further modified for fly ash treatment, such as according to FIG. 1 or 2. FIG. 4 shows a modification of FIG. 3 with a feed port 228 for introducing fly ash into the reactor 212. Using the example of FIGS. 3 and 4, certain conduits of FIGS. 1 and 2 can be replaced with other types of passages for delivering ash of additional materials to the reactor.

Some of the features of the apparatus of FIG. 3 that are present (or are optionally provided) are that air (oxygen) for the incinerator 210 and the reactor 212, facilitated by their close proximity, may come from the same air blower source (not shown). That would include air for gasification in the GVR 212 and also any air for other purposes such as GVR syngas combustion, if desired, and plasma torch gas or shroud gas, if used.

FIG. 3 shows the example reactor 212 that includes an inlet 238 into its upper region for syngas combustion air. Such a location can also be provided, optionally, with a burner (or igniter) for the syngas, to be used when desired. An upper part of the reactor 212 is referred to as a syngas secondary combustion zone in this example.

FIG. 3 shows an example reactor 212 that is a plasma GVR with plasma torches 240 for directing a plasma plume into a bottom section of the GVR (which would normally have a carbonaceous bed within it).

The reactor 212 also has an additional feed material inlet (nozzle or tuyere) 242 for any feed material in addition to the bottom ash from the incinerator 210. The additional feed material may be among any of those previously mentioned, or otherwise desired to be provided, including such things as medical waste, coke (or other carbonaceous) additions, and various mixtures of feed materials.

At the bottom of the reactor 212 is a tap hole 212a for slag output that flows through a conduit 234 to some receptacle. While a variety of reactor types may be used in the described systems, ones that stand out are plasma GVRs to gasify and/or vitrify the ash. Of particular interest are plasma GVRs of the type having a stationary bed of carbonaceous material (e.g., metallurgical coke or other carbon) in a bottom section of a vertical reactor structure with tuyeres for plasma torches and for possible inlet air, other gases and/or particulate solids. Particular examples of suitable plasma GVRs, and also the providing of carbonaceous beds that may include substantial amounts of carbon not from fossil fuels, can be found in U.S. Patent Application Publication No. 2010/0199557, Aug. 12, 2010, by Dighe et al., entitled "Plasma Gasification Reactor"; U.S. Patent Application Publication No. 2012/00061618, Mar. 15, 2012, by Santoianni et al.; and U.S. patent application Ser. No. 13/199,813, filed Sep. 9, 2011, by Gorodetsky et al., all of which are incorporated by reference herein for their descriptions of plasma GVRs, gasification systems, and their operation.

Additional PGVRs and their various uses are described in, for example, U.S. Pat. No. 7,632,394 by Dighe et al., issued Dec. 15, 2009, entitled "System and Process for Upgrading Heavy Hydrocarbons"; and U.S. Patent Application Publication No. 2009/0307974 by Dighe et al., entitled "System and Process for Reduction of Greenhouse Gas and Conversion of Biomass"; which are incorporated by reference herein for their descriptions of PGVRs and methods practiced with them.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope of the present invention as set forth in the appended claims.

What is claimed is:

1. A method for treatment of ash from incineration plants, the method comprising:
   collecting ash from an incinerator;
   feeding the collected ash to a vitrification reactor;
   vitrifying the ash in the vitrification reactor, to form a slag of molten material;
   allowing the slag to flow from the vitrification reactor and solidify outside the vitrification reactor;
   gasifying volatile components in the ash and additional feed material; and
   routing flue gas generated in the vitrification reactor to a heat exchanger, wherein the heat exchanger is connected to a heat recovery steam generator that receives exhaust from the incinerator.

2. The method of claim 1, further comprising:
   feeding additional feed material into the vitrification reactor, wherein additional feed material comprises at least one of: municipal solid waste (MSW), RDF, biomass, coal, hazardous waste, medical waste, liquid waste streams of coal or other carbonaceous products, or a combination thereof.

3. The method of claim 1, wherein the ash comprises:
   bottom ash and fly ash are fed into the vitrification reactor together or separately.

4. The method of claim 1, wherein the ash is fed through a charge door or feed chute above a carbonaceous bed of the vitrification reactor.

5. The method of claim 1, wherein the ash is fed through a tuyere into a carbonaceous bed of the vitrification reactor.

6. The method of claim 1, wherein the ash is fed into the vitrification reactor either with or separate from a plasma torch plume.

7. The method of claim 1, wherein the molten slag includes hazardous material from the additional feed material.

8. The method of claim 7, wherein the molten slag includes up to about 90% of the hazardous material from the additional feed material.

9. The method of claim 1, further comprising:
   supplying stoichiometric amounts of air, oxygen, or both, for combustion of syngas in the vitrification reactor.

10. The method of claim 1, further comprising:
    supplying air, oxygen, or both, for combustion of syngas in the vitrification reactor, where in the amount of air, oxygen, or both exceeds a stoichiometric amount.

11. An apparatus comprising:
    an incinerator;
    a vitrification reactor;
    a first feed passage for transporting bottom ash from a bottom of the incinerator to the gasification/vitrification reactor;
    an incinerator exhaust gas fly ash recovery system including a heat recovery steam generator configured to receive exhaust gas from the incinerator;
    a second feed passage for transporting fly ash collected by the recovery system to the vitrification reactor; and
    a vitrification reactor exhaust gas fly ash recovery system including a heat exchanger connected to the heat recovery steam generator.

12. The apparatus of claim 11, wherein the vitrification reactor includes:
    a port for feeding additional feed material into the vitrification reactor, wherein additional feed material can comprise at least one of: municipal solid waste (MSW), RDF, biomass, coal, hazardous waste, medical waste, liquid waste streams of coal or other carbonaceous products, or a combination thereof.

13. The apparatus of claim 11, wherein the incinerator exhaust gas fly ash recovery system further comprises one or more of:
    a scrubber and a bag filter, coupled between the incinerator and an emission stack.

14. The apparatus of claim 11, wherein the vitrification reactor exhaust gas fly ash recovery system further comprises one or more of:
    a scrubber and a bag filter, coupled between the vitrification reactor and an emission stack.

15. The apparatus of claim 11, wherein the vitrification reactor includes a slag tap hole and an external slag receptacle for slag solidification.

16. The apparatus of claim 11, wherein the vitrification reactor comprises:
    a plasma vitrification reactor.

* * * * *